US012160510B2

(12) United States Patent
Karadigudda et al.

(10) Patent No.: US 12,160,510 B2
(45) Date of Patent: Dec. 3, 2024

(54) AUTOMATIC KEY CLEANUP TO BETTER UTILIZE KEY TABLE SPACE

(71) Applicant: Dell Products L.P., Round Rock, TX (US)

(72) Inventors: Mahadev Karadigudda, San Jose, CA (US); Madhu Agrahara Gopalakrishna, Fremont, CA (US); Sankalp Suhas Taralekar, Santa Clara, CA (US)

(73) Assignee: Dell Products L.P., Hopkinton, MA (US)

( * ) Notice: Subject to any disclaimer, the term of this patent is extended or adjusted under 35 U.S.C. 154(b) by 292 days.

(21) Appl. No.: 17/722,560

(22) Filed: Apr. 18, 2022

(65) Prior Publication Data

US 2023/0336339 A1 Oct. 19, 2023

(51) Int. Cl.
*H04L 9/08* (2006.01)
*G06F 12/02* (2006.01)
*G06F 21/62* (2013.01)

(52) U.S. Cl.
CPC ........ *H04L 9/0891* (2013.01); *G06F 12/0253* (2013.01); *G06F 21/6218* (2013.01); *H04L 9/0894* (2013.01)

(58) Field of Classification Search
CPC . H04L 9/0891; H04L 9/0894; G06F 21/6218; G06F 12/0253
See application file for complete search history.

(56) References Cited

U.S. PATENT DOCUMENTS

| | | | |
|---|---|---|---|
| 6,091,820 A | 7/2000 | Aziz | |
| 8,284,945 B2 | 2/2012 | Breyel | |
| 8,365,138 B2* | 1/2013 | Iborra | G06F 16/2365 717/113 |
| 8,527,544 B1* | 9/2013 | Colgrove | G06F 3/0641 707/791 |
| 9,628,274 B1* | 4/2017 | Jenks | H04L 9/0894 |
| 10,523,434 B1* | 12/2019 | Sharifi Mehr | H04L 9/0891 |
| 10,659,225 B2* | 5/2020 | Surla | H04L 9/0894 |
| 10,931,450 B1 | 2/2021 | Chellappa | |
| 11,075,913 B1* | 7/2021 | Theimer | H04L 63/101 |
| 2006/0291664 A1 | 12/2006 | Suarez | |
| 2016/0050272 A1 | 2/2016 | Raduchel | |

(Continued)

OTHER PUBLICATIONS

NPL Search Terms (Year: 2024).*

*Primary Examiner* — Syed A Zaidi
(74) *Attorney, Agent, or Firm* — Staniford Tomita LLP

(57) ABSTRACT

Embodiments for deleting encryption keys in a data storage system by storing a current encryption key in a key table, the current key encrypting at least some data in one or more data containers of a filesystem of the data storage system. A key table maintains a starting container ID and an ending container ID for each container encrypted by the current encryption key, and a deleted container count counting a number of containers of the one or more data containers deleted from the file system. The process determines if the number of containers in the deleted container count equals a number of containers having data encrypted by the encryption key as determined by the starting container ID and ending container ID, and if so, marks the key for deletion in a garbage collection operation, which then deletes the key from the key table.

20 Claims, 8 Drawing Sheets

(56) References Cited

U.S. PATENT DOCUMENTS

| | | |
|---|---|---|
| 2017/0285978 A1 | 10/2017 | Manasse |
| 2020/0143065 A1* | 5/2020 | Hersans .............. G06F 21/6218 |
| 2020/0244445 A1 | 7/2020 | Ponnusamy |
| 2020/0387479 A1* | 12/2020 | Karr ...................... G06F 16/125 |
| 2021/0218548 A1 | 7/2021 | Abraham |
| 2021/0232459 A1 | 7/2021 | Katiyar |
| 2022/0121766 A1* | 4/2022 | Chong .............. G06F 16/24552 |
| 2022/0180000 A1 | 6/2022 | Sofia |
| 2022/0329422 A1* | 10/2022 | Lin .......................... H04L 9/50 |

\* cited by examiner

600

| TABLE ENTRY | DATA ELEMENT |
|---|---|
| 1 | Encryption Key Information |
| 2 | Encryption Algorithm |
| 3 | Current Key State |
| 4 | Source Key Manager |
| 5 | Beginning Container ID |
| 6 | Ending Container ID |
| 7 | Deleted Container Count |

| KEY INDEX | CONTENTS |
|---|---|
| Key-index1 | • Muid<br>• Encryption Key<br>• Key length<br>• Minimum Container ID<br>• Maximum Container ID<br>• Containers Deleted |
| Key-index2 | • Muid<br>• Encryption Key<br>• Key length<br>• Minimum Container ID<br>• Maximum Container ID<br>• Containers Deleted |
| . . . | . . . |
| Key-index*n* | • Muid<br>• Encryption Key<br>• Key length<br>• Minimum Container ID<br>• Maximum Container ID<br>• Containers Deleted |

FIG. 7

AUTOMATIC KEY CLEANUP TO BETTER UTILIZE KEY TABLE SPACE

TECHNICAL FIELD

Embodiments relate generally to data encryption, and more particularly to automatically cleaning up encryption keys to better utilize key table space.

BACKGROUND OF THE INVENTION

With the increasing need to secure data access in data storage systems, it is necessary to ensure that data is secure throughout its lifecycle from on-disk storage to in-memory access. Current key-based encryption systems encode the data such that it can only be accessed or decrypted by a user with the correct encryption key. The longer that a particular key is in use, the more susceptible it is to compromise due to hacking, inadvertent disclosure, or other similar causes. While encrypting data at rest, a storage system can get encryption keys from one of the several supported key managers. For security reasons, users rotate these encryption keys periodically to prevent too much data from being encrypted with a single key. Users are typically provided options to automatically rotate keys periodically by setting up a key rotation policy. For example, rotation periods can be set to weekly or monthly key rotation and the assumption is that keys will be rotated at that frequency. To ensure consistent security, it is important for storage systems to rotate encryption keys at the defined key rotation intervals. If keys are not rotated with sufficient frequency, a large amount of data may be encrypted using a single key, which can expose the data to security vulnerabilities if that single key is compromised.

Frequent key rotation periods (e.g., daily or weekly) can ensure that manageable subsets of data are encrypted with different keys, but with such an aggressive key rotation policy, many keys will be created in the system over a long period of time. Managing many encryption keys can often lead to resource consumption and difficult management. Moreover, a larger key set takes longer to synchronize with an external key manager such one that uses the Key Management Interoperability Protocol (KMIP). Exporting and importing keys also adds processing overhead if there are large number of keys in the system.

What is needed, therefore, is an encryption key management system that automatically performs regular key cleanup processes to help reduce the number of keys stored and managed in a data processing system.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, and Data Domain Restorer are trademarks of Dell EMC Corporation.

BRIEF DESCRIPTION OF THE DRAWINGS

In the following drawings, like reference numerals designate like structural elements. Although the figures depict various examples, the one or more embodiments and implementations described herein are not limited to the examples depicted in the figures.

FIG. 6 is a table illustrating a key table used for garbage collection in a key rotation process, under some embodiments.

FIG. 7 illustrates a key table organized by key-index, under some embodiments.

DETAILED DESCRIPTION

Figure 1:
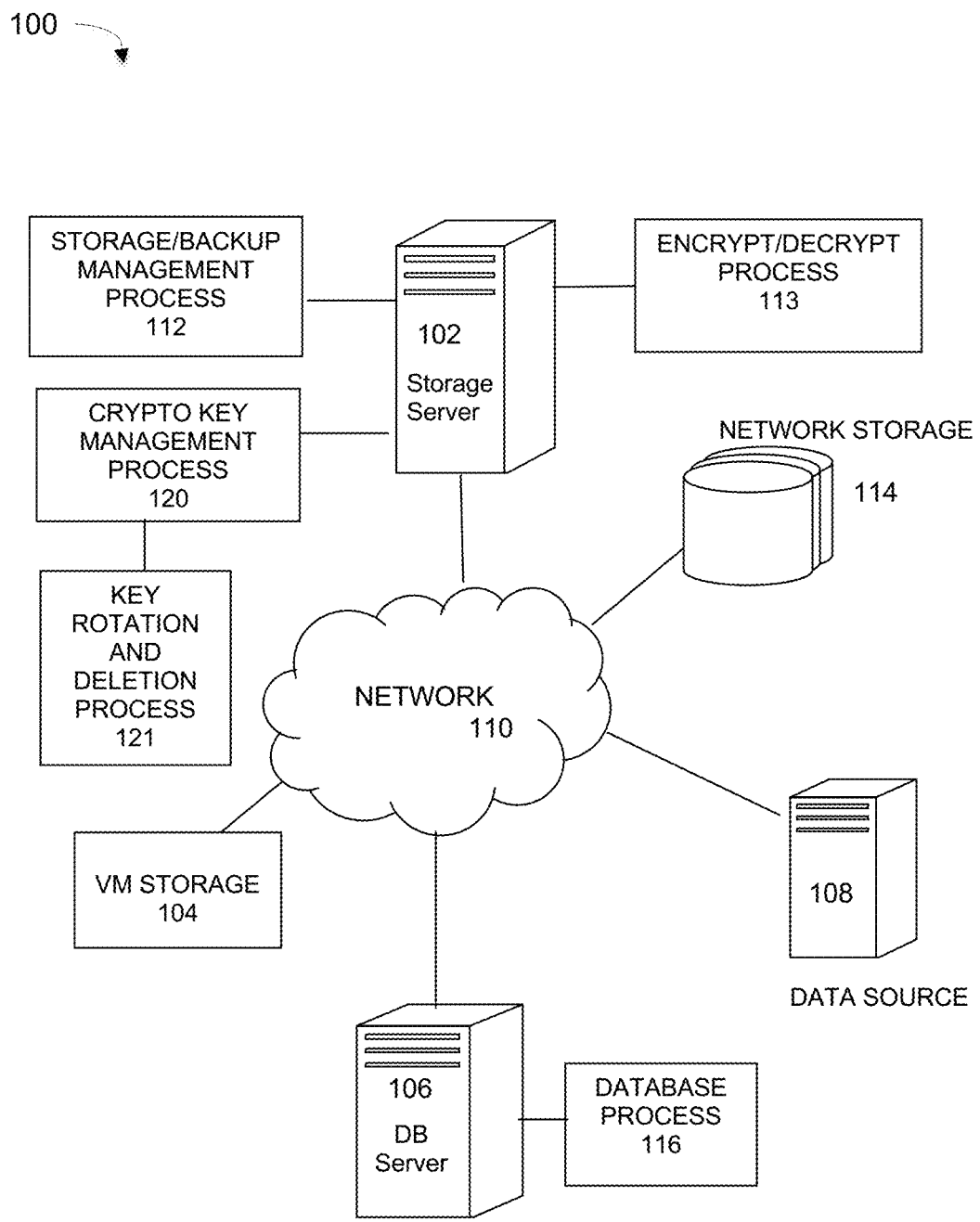
FIG. 1 is a diagram of a computing network implementing a key rotation and cleanup mechanism, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software and systems deployed in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments of a key management system performs key rotation with automatic key cleanup so that keys that no longer encrypt any data are removed from the key table to free up key table space. Such embodiments help the storage system avoid managing keys that are not needed.

FIG. 1 illustrates a networked data storage system that implements one or more embodiments of a key management process implementing deletion of unused keys from a key table, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source maybe a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

Data Domain is an example of a purpose-built backup appliance providing streaming deduplication that is able to ingest data at full network speeds, from multiple backup sources while providing storage efficiency.

Encryption keys used for encrypting data at rest are rotated at cadence to ensure that large amounts of data are not dependent on a single encryption key, which creates the risk of a single point of failure when securing data at rest. Data encryption key management system 100 is handled by a dedicated cryptographic key management module 120 that ensures that key rotation is handled seamlessly with ongoing data ingest and restore operations.

In an embodiment, the cryptographic key management system is used in a data storage system that implements a deduplication backup process, such as a Dell EMC Data Domain (DD) system. The Data Domain File System (DDFS) is an inline data deduplication file system. As data gets written to the file system, DDFS breaks it into variable sized segments and a group of segments are packed in a compression region. A number of compression regions are grouped together and written as a container to disk. DDFS calculates fingerprint signatures for each segment using SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

Systems such as DDFS may use the Key Management Interoperability Protocol (KMIP), which defines message formats for the manipulation of keys on a key management server. This facilitates data encryption by simplifying encryption key management. Keys may be created on a server and then retrieved. Both symmetric and asymmetric keys are supported, including the ability to sign certificates. KMIP also allows for clients to ask a server to encrypt or decrypt data, without needing direct access to the key. Under KMIP, each key has a cryptographic state. Keys are created in an initial state, and must be activated before they can be used. Keys may then be deactivated and eventually destroyed. A key may also be marked being compromised.

Keys may be generated and stored locally to a server, or they may be provided from an external key source, such as one that implements KMIP to provide keys to key clients.

A key can become compromised due to a variety of reasons or acts. For example, a compromised key can result from the unauthorized disclosure of a key so that all data encrypted by that key could be accessed by unauthorized parties. The integrity of a key could be compromised by invalid modification or substitution so that the key could be used for the wrong purpose or for the wrong application. The key's association with the owner could be compromised so that the identity of the other party cannot be assured or the data cannot be properly decrypted. Finally, the key's association with other information can be compromised so that the key is not associated with any data or the wrong data.

As stated above, it is necessary to rotate keys frequently to prevent an excess amount of data being encrypted by a single key. For example, with successful key rotations, 100 TB of data may be encrypted in chunks of 10 TB each with a different respective encryption key, whereas in the case of key rotation failure, all 100 TB may be encrypted with only one key, thus exposing the entire dataset to vulnerability rather than just one 10 TB chunk.

If a key gets compromised, the user must re-encrypt all the data associated with that compromised key. If a large amount of data (e.g., 100 TB versus 10 TB) is associated with a single compromised key, a great deal more time will be required to re-encrypt the data. The chance of security vulnerability increases in case of such a delay in re-encrypting that data, which may lead to disruptions in regular backup and restore operations. Therefore, defining and adhering to an effective key rotation policy is of great importance. Failing to rotate keys in case of failure and not re-trying the rotation at a later point in time can be a problem as it ends up encrypting larger amounts of data with a single key.

Figure 2:
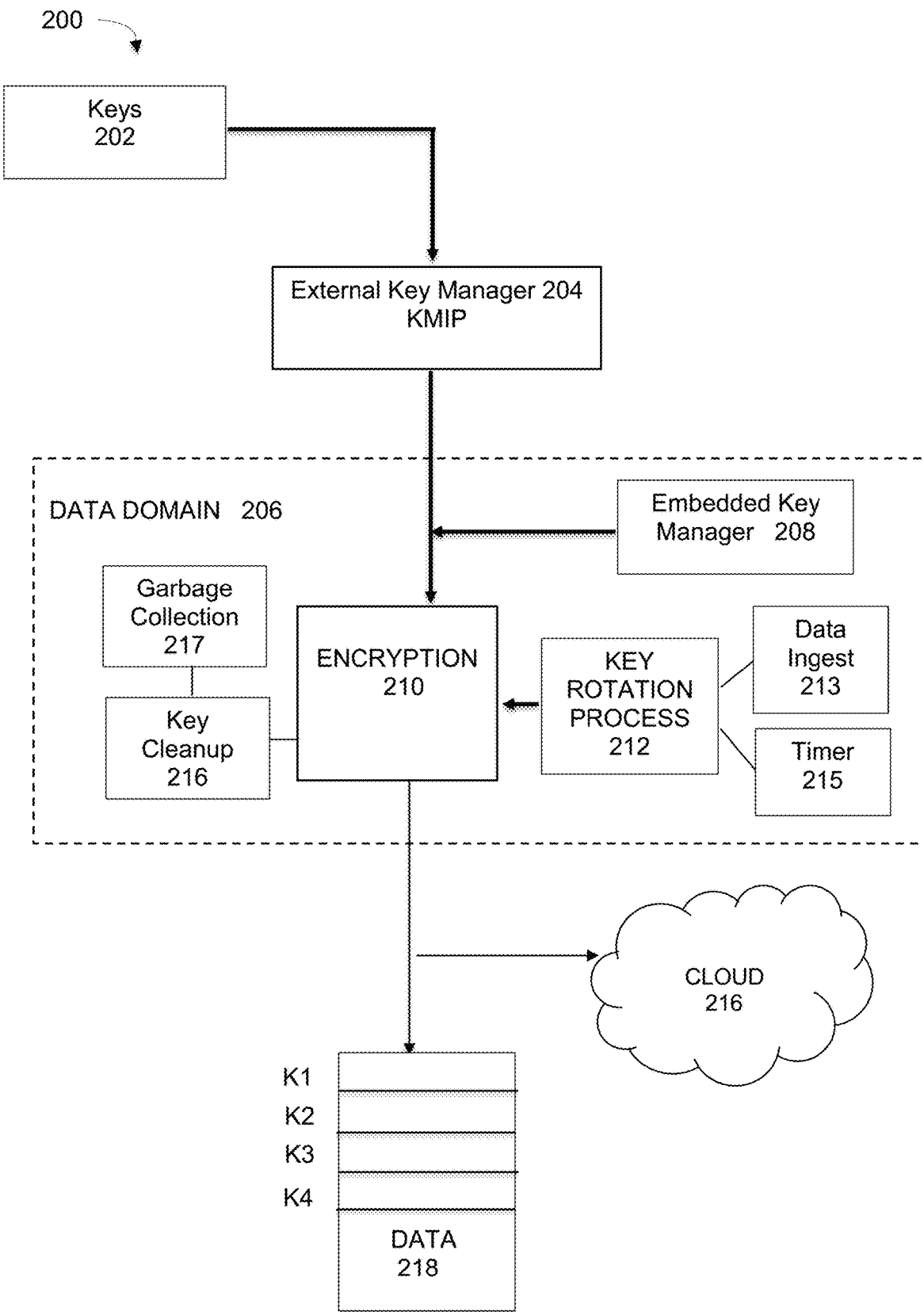
FIG. 2 illustrates the use of a key rotation process in conjunction with a Data Domain Reduplication system, under some embodiments.

FIG. 2 illustrates the use of a key rotation process in conjunction with a Data. Domain Deduplication system, under some embodiments. Although embodiments are described with respect to Data Domain and DDFS systems, it should be noted that any other similar deduplication backup system can be used. As shown in system 200, the Data Domain system 206 includes a key manager and encryption process 210 which encrypts data 218 using keys K1, K2, K3, K4, . . . , Kn. The keys used by the key manager can be sourced externally or internally. For example, keys 202 sourced externally can be sourced using a KMIP external key manager 204. Encryption keys are readily available from a number of key vendors, and most use the KMIP protocol, however, the external server housing the keys represents a point of vulnerability as a possible target for hackers and other system attacks. Some data storage systems utilize embedded or internal key sources. As shown in FIG. 2, Internal keys can come from an internal key manager or source 208. Regardless of source, the keys are used for data encryption by the key manager 210. The encrypted data 218 can be stored in local (active tier) storage or it can be stored in the cloud 216.

As stated above, in the case of encrypted data, if any key compromise situation occurs, data encrypted with a compromised key must be re-encrypted to ensure the integrity of the data. If large amounts of data are encrypted by a single key, this re-encryption process can take a long time. This is especially true of data stored in the cloud 218. In this case, re-encrypted hundreds of TB of data in the cloud tier can take on the order of several weeks or even months.

Embodiments of system 200 include a key rotation process 212 that works with or is part of encryption process or subsystem 210. The key rotation process uses one or both of a size or time-based rotation policy that tries to ensure that each chunk of data encrypted by a key is the same or nearly the same size as the other encrypted chunks to prevent any one key from encrypting an excessive amount of data. Thus, as shown FIG. 2, the data 218 encrypted as data chunks by each of keys K1, K2, K3, and K4 should be equal or at least approximately equal to each other.

Current systems generally use a scheduler process to periodically rotate their keys. One example is the cron command-line utility (cron job), which is a job scheduler on Unix-like operating systems that allows users to schedule jobs (commands or scripts) to run periodically at fixed times or intervals. Using a mechanism like cronjob, a user would define the rotation interval (e.g., once a day, once a week, etc.) through an appropriate parameter definition (e.g., crontab). The system then attempts to rotate the key at the specified interval, and if the rotation is a success, the next key rotation is performed at the time or date set in cronjob. However, if key rotation fails and the cronjob entry is not updated, then key rotation will simply stop happening form that time onwards. That is, at the time of automated key rotation failure, the key rotation process exits even when the next key rotation date is not successfully set. The previous key is used again continuously, thus leading to the potential problem of large amounts of data getting encrypted by a single key.

As shown in FIG. 1, and further described in FIG. 2, system 100 includes a key rotation and deletion process 121 that is part of or accessed by the key management process 120. This process ensures that key rotation is attempted at every key rotation interval so that roughly equal amounts of data will be encrypted with each key. The process 121 also ensures that old, unused keys are automatically removed from the key table and system to reduce key storage and management overhead.

Figure 3:
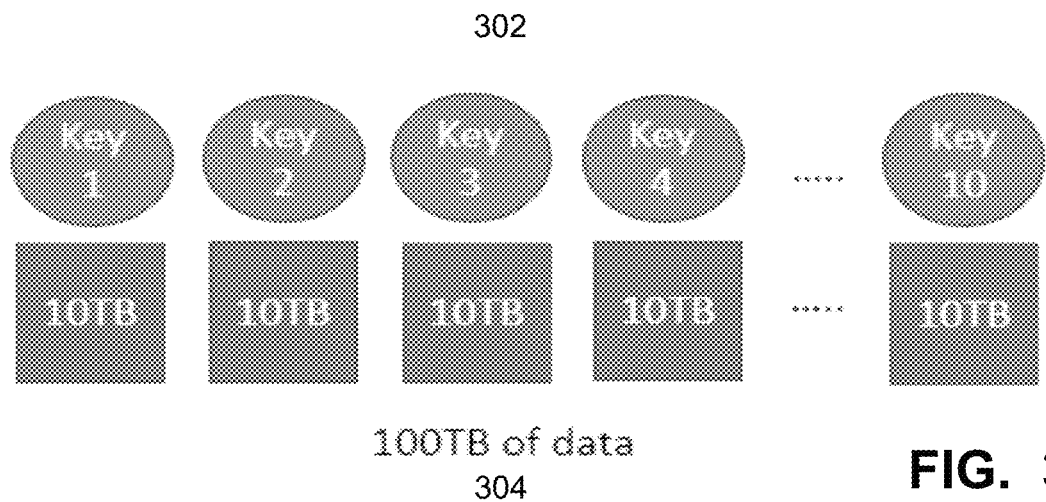
FIG. 3 illustrates a size-based encryption key rotation, under some embodiments.

FIG. 3 illustrates a size-based encryption key rotation, under some embodiments. As shown in FIG. 3, a 100 TB dataset 302 is to be encrypted by a number of keys. The dataset can be divided into chunks of any practical size, with each chunk encrypted by its own key. For the example of FIG. 3, the data 302 is divided into 10 chunks of 10 TB each, and each chunk is encrypted by a respective key 304 from key 1 to key 10. Any other appropriate division of the dataset 304 is also possible, such as quarters, fifths, and so on depending on system constraints and requirements.

Figure 4:
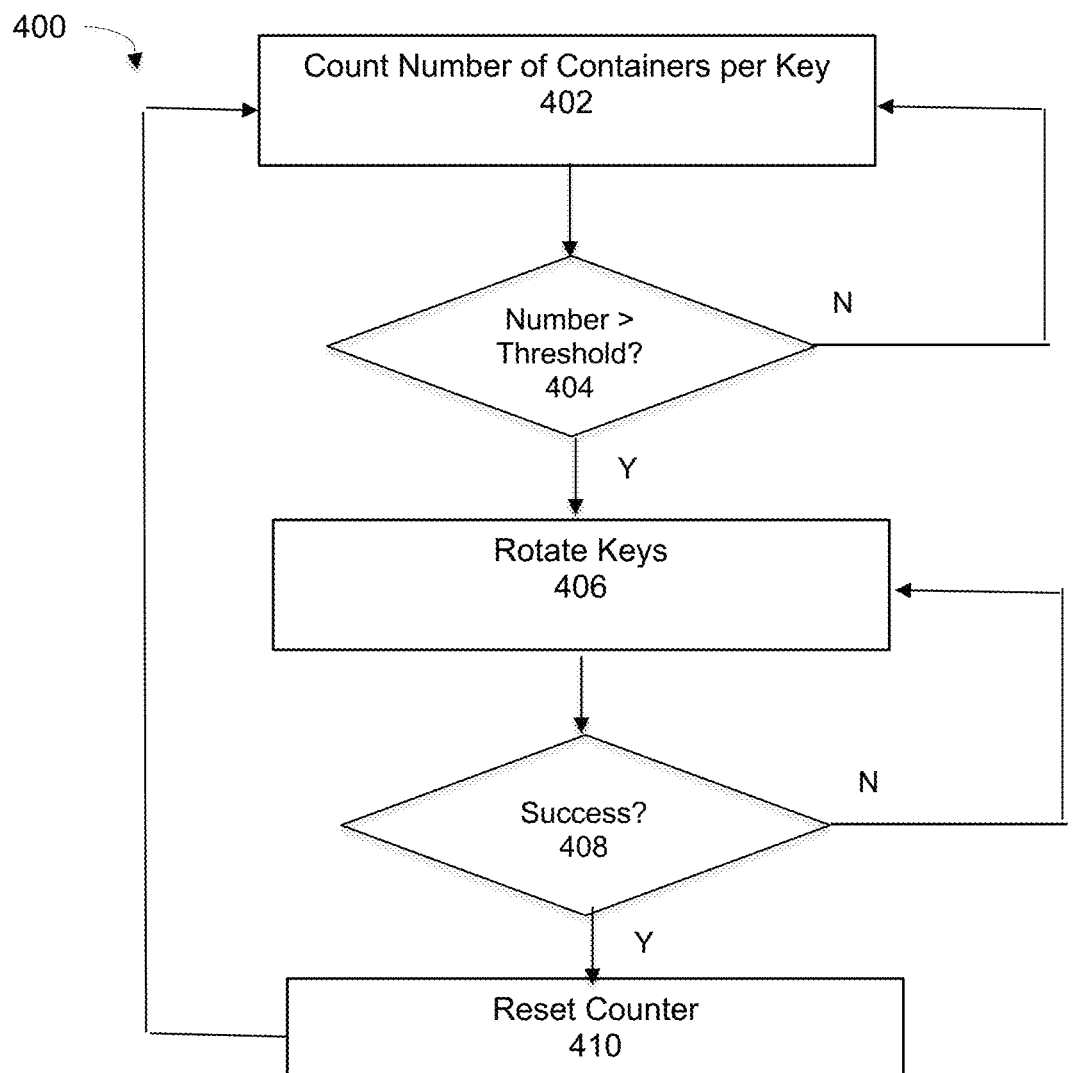
FIG. 4 is a flowchart illustrating a method of performing size-based key rotation, under some embodiments.

For the size-based key rotation, the key rotation process 212 utilizes or includes a data ingest counter 213 to keep track of the amount of data gathered into each chunk and assigned for encryption by a key. Any relevant measure of data I/O can be used, such as the number of containers per key. FIG. 4 is a flowchart illustrating a method of performing size-based key rotation, under some embodiments. Process 400 begins with the key rotation process counting the number of containers per key, 402, such as by using the data ingest measurement process 213. The system then determines if the amount of data exceeds a pre-defined threshold value, 404. This threshold representing the amount of data to be encrypted by a single key can be set to a strict value, or it can be selected and configured by a user. Typical values may be on the order of 5 TB or 10 TB per key, or any other appropriate amount of data.

When the amount of data (e.g., number of containers) exceeds the threshold, the key rotation process rotates the keys so that the next set of data is encrypted by a different key, 406. The system next determines if the key rotation was a success 408, and if not it attempts key rotation again, 406. With respect to determination of success or failure, based on the API response, system will determine if key rotation succeeded or failed. If the key rotation is successfully completed, the system then resets the counter and counts the number of containers for the next key.

As can be seen in FIG. 4, with size-based key rotation, when data with a particular key reaches a threshold, the process will trigger key rotation automatically. When supporting KMIP on the cloud tier, the system needs to support key compromised events in the cloud tier also. As stated above, if there is a large amount of data in cloud tier, then it takes lots of time to re-encrypt the data in case of key compromised event, which can be very costly. This method of key rotation is helpful for other large-scale data systems as well given that security is primary focus in today's vulnerable data world. Encrypting a lesser amount of data with each key helps to address the case when one or more individual keys get compromised. In this case, re-encrypting a lesser amount of data will be faster and security risks during the compromise period will be reduced.

The size-based encryption process involves using a counter 213 for the number of containers encrypted per key at the time of ingest, garbage collection and data movement. Whenever that counter reaches the threshold value, a key rotation request will be made to encryption subsystem. Then encryption subsystem 210 and key rotation process 212 will take care of rotating the key and also handles key rotation failure by retrying key rotation at a later time.

Another type of key rotation process is time-based key rotation with automatic re-try, which expands on current key rotation mechanisms. Whereas current systems simply stop key rotation in the case of rotation failure, embodiments of the key rotation process automatically updates the next key rotation time or date to the following rotation interval even in case of key creation failure. This process can also raise an alert to the user that key rotation has failed, so that a manual key rotation can be performed, if desired. In case a user misses seeing or responding to that alert, the key rotation will be tried automatically in the next key rotation interval. In this manner, key rotation will not stop at the first failure, as happens in current systems.

Figure 5:
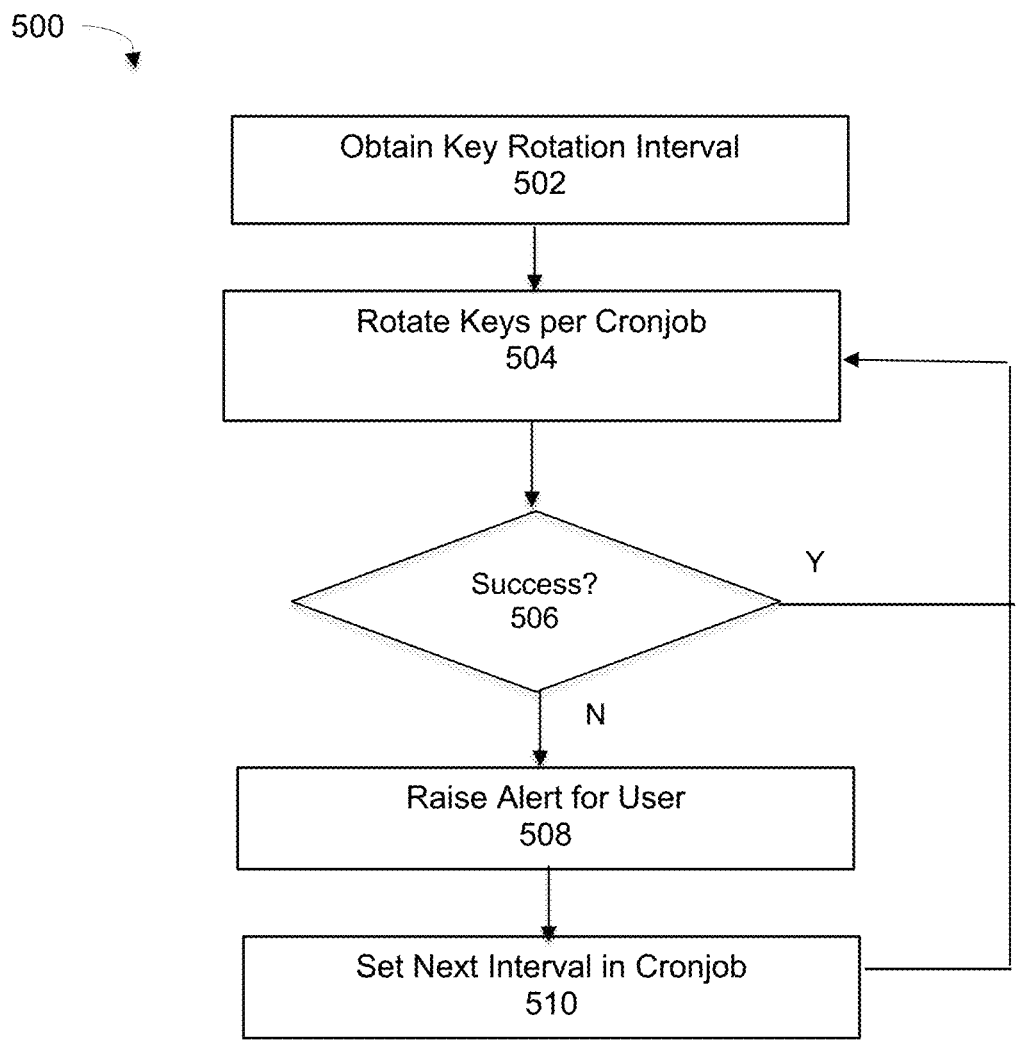
FIG. 5 is a flowchart illustrating a method of performing time-based key rotation, under some embodiments.

The time-based key rotation process 212 utilizes an internal or external timer 215 to keep track of time between key rotations (rotation intervals). FIG. 5 is a flowchart illustrating a method of performing time-based key rotation, under some embodiments. As shown in FIG. 5, process 500 starts with the system obtaining the key rotation interval, such as through the Cronjob script, 502. The process then automatically rotates the keys upon the specified interval, 504. The system then determines whether or not the key rotation is a success, 506. If so, the next key rotation interval is automatically performed as defined in Cronjob, 504. If the key rotation is not a success, the system raises an alert for the user who can then manually force a key rotation, or take other remedial measures, 508. The system also sets the next key rotation interval in Cronjob, 510, so that the keys are then attempted to be automatically rotated at the next interval, 504.

FIG. 5 illustrates the significant changes and improvements to current key rotation systems by introducing an alert mechanism and automatic key rotation re-try where key rotation will be tried at the next interval. In some embodiments, the automatic re-try interval may be the same as the original interval 502, or it may be changed to a different (e.g., more frequent) interval. This automatic setting of the next key rotation interval and rotation re-try mechanism correctly ensures the periodic rotation of keys in the event of key rotation failures. In the case of multiple successive key failures and automatic re-try failures, the alert mechanism should provide adequate notice for the user to trigger a manual key rotation, thus providing a further level of key rotation backup.

In an embodiment, the key rotation process 212 implements either the size-based key rotation 400 or the time-based rotation 500. In another embodiment, the key rotation process 212 may implement both size and time-based key rotation in a nested rotation scheme.

Rotated keys are used re-organize containers that contain data encrypted at different times and using different keys. In an embodiment, fragmented space can be re-organized and re-encrypted to form a new data chunk encrypted using a new key. The old key for these fragments can be set to read-only, while the new key can be set to read/write or write only.

Key Cleanup

As stated in the Background section, there is a trade-off with the frequency of key rotation and the amount of data encrypted with each key. Keys must be rotated regularly to prevent time exposure to corruption or excessive data collection, but should generally not be used to encrypt only small amounts of data. With frequent or aggressive key rotation intervals (e.g., on the order of hourly or daily) there may be many keys created in the system over a long period of time. These keys consume space in a key table that may be maintained in local memory. Active keys must also be exported among storage tiers at runtime. Consequently, it may become difficult to maintain large number of keys and at some time there may be no place to create new keys. An overly large key set also takes longer synchronize with the external key manager (e.g., KMIP), and storage overhead may be unduly burdened.

In a containerized system, each container is encrypted using a single key. Thus, each key encrypts all of the data in a container, which represents a discrete unit of data encrypted with a particular key. An encryption key may encrypt a single container or multiple containers. Once all container or all the data of the containers encrypted by a key are deleted, that key is considered unused and 'deletable' in the system.

In a deduplicating storage system (e.g., DDFS) based on liveness and other conditions, space reclamation often consolidates multiple containers on an on-going basis. At such time, all new containers are encrypted with the latest key. Thus, the amount of data encrypted with older keys begins to progressively decrease as data is created. An encryption key is kept in the system as long as there is any data at all that is encrypted with that key. Keys can thus live for much longer than their rotation interval, and many old unused keys can remain in the key inventory. For example, a new key may encrypt 5 TB of data within the first half of its lifetime, and as it ages many of the data files will be deleted, resulting in a point in time where maybe only one or two files exist for that encryption key. Once these files are deleted, the key is no longer needed, but until that point, the key is maintained in the key table.

As shown in FIG. 2, the Data Domain system 206 includes a key cleanup 216 and garbage collection process 217 that reclaims space from unused data elements and system resources, such as encryption keys. Thus, if at some point, the deduplicating storage system detects that no existing data is encrypted with an old key, it can then initiate a self-delete operation on that key using this garbage collection process. This will result in automatically freeing up of unused key entries in the key table.

A standard data encryption key table used in current storage systems, such as DDFS, stores per-key information including: encryption key information, encryption algorithm, current state of the key, and source key manager.

Under an embodiment, the key table is expanded to add additional per-key data structures for beginning and ending container IDs and a deleted container count to facilitate automatic garbage collection for unused keys. FIG. 6 is a table 600 illustrating a key table used for garbage collection in a key rotation process, under some embodiments. As shown in FIG. 6, the key table includes encryption key information, encryption algorithm, current state of the key, source key manager, beginning container ID, ending container ID, and deleted container count. In an embodiment, the deleted container count is a new field per key indicating number of deleted containers within the above range. When a GC cycle deletes containers, this count is incremented by 1. Progressively, this count will increase, and when it reaches the count of all containers encrypted with that key, there should not be any data left that was encrypted with that key. At that point, the key can be marked as deleted and subsequently removed in a next GC cycle.

The deleted container count is increased by one for each container that no longer contains data encrypted by the current encryption key. A deleted container count that matches the difference between the ending container ID and the starting container ID indicates that zero containers have data encrypted by the current encryption key. For example, consider a case where an old encryption key is used to encrypt 1000 containers so that the minimum container ID is 1 and maximum container ID is 1001. Over time, the data associated with (encrypted by) this key progressively reduces because of expiration of backup data, and during that time the number of deleted containers for this key increases. The deleted container count for this key thus increases and when this count reaches 1000, it becomes equal to the difference between maximum container ID and minimum container ID (1001−1). At that time this key can be marked for deletion.

FIG. 7 illustrates a key table organized by key-index, under some embodiments. FIG. 7 illustrates some per-key data elements for n keys stored in key table 700 including a machine unique identifier (Muid), Encryption key, key length, Min/Max Container ID and Containers deleted count. The minimum container ID and maximum container ID entries in table 700 correspond respectively to the beginning container ID and ending container ID entries of table 600. The tables of FIG. 6 and FIG. 7 are provided for purposes of illustration only, and other key table structures may also be used.

Figure 8:
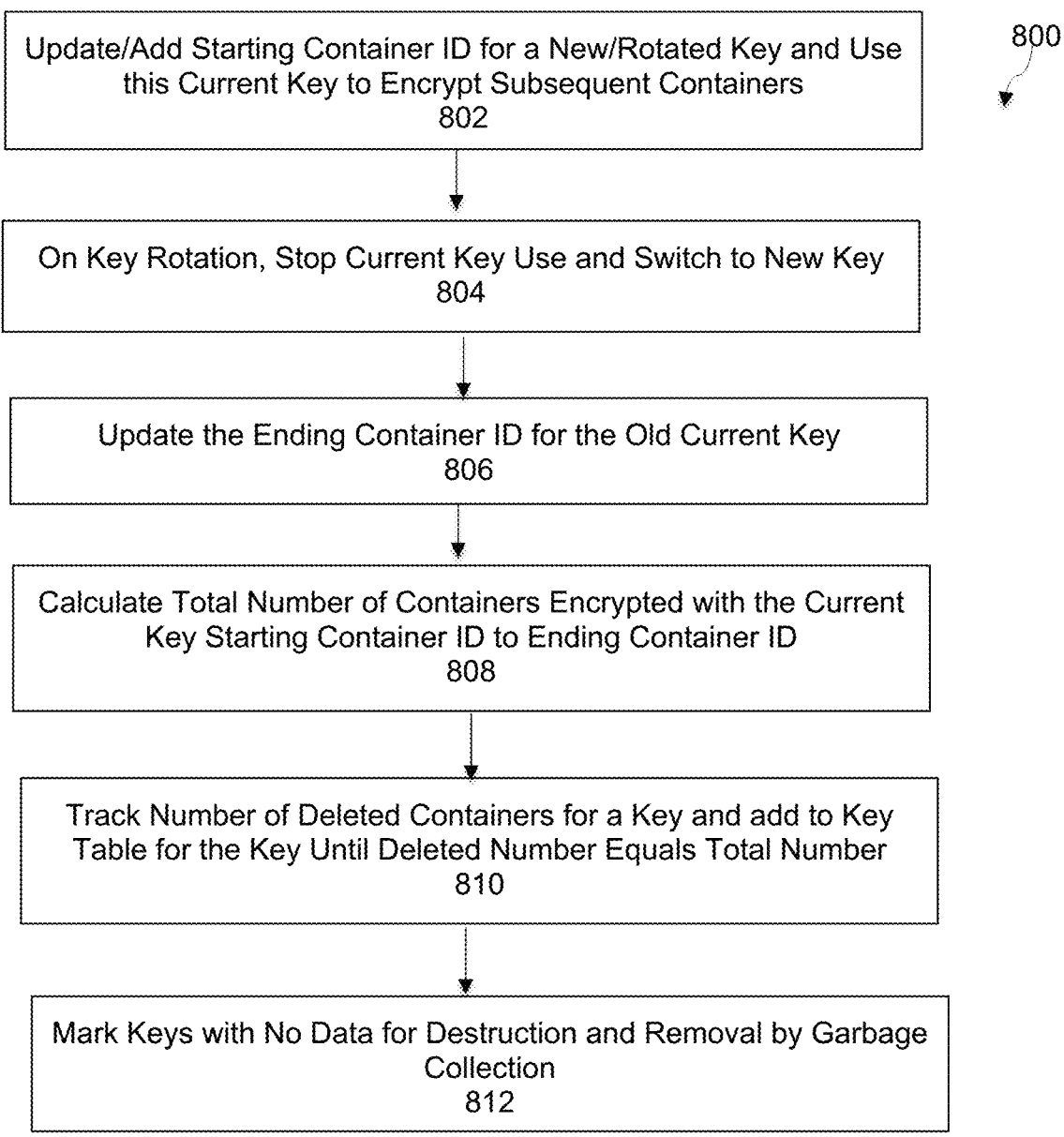
FIG. 8 is a flowchart that illustrates a method of garbage collection using a key table, under some embodiments.

FIG. 8 is a flowchart 800 that illustrates a method of garbage collection using the key table structure of FIG. 6 or 7, under some embodiments. At the beginning of key rotation, the starting container ID will be added/updated in the per-key structure for a current key, and subsequent containers will be encrypted using this current key, 802. At the time of a next key rotation, the storage system will stop encrypting new data with current key and will switch to the new key, 804. At this time, the ending container ID will be added/updated to the key table for that current key, 806. Hence, the number of containers encrypted with a key will be the difference between values held in these two data structures, and can be calculated as such, 808. In an embodiment, another per-key field indicating number of deleted containers within the above range is added to the key table, as shown in FIG. 7. When space reclamation activity such as garbage cleaning deletes containers for any reason, this "delete count" data structure is incremented, 810. Progressively, this count should go up and when it reaches the count of all containers encrypted with that key, there should no longer be any data left that was encrypted with that key. A key with no data can be put in a destroyed state, which will allow the garbage collection process to do a second swipe. After every cycle of garbage collection, the filesystem will find the keys that do not have any data associated with them. Those keys will be automatically marked for destruction, 812. A subsequent GC cycle will move that key state to destroyed and the key will be deleted automatically.

An encryption key is considered unused and marked for deletion when there is no data remaining in the system that is encrypted with that key. That is, no containers have any data using that key. In an embodiment, a user or system defined minimum threshold value may be used to define an unused key. Such a value may be expressed as an absolute value, such as 1 MB or less, or it may be expressed as a percentage of overall storage space, e.g., 10% or less. Thus, no data represents 0 MB or 0%, and is considered a default threshold value.

Figure 9:
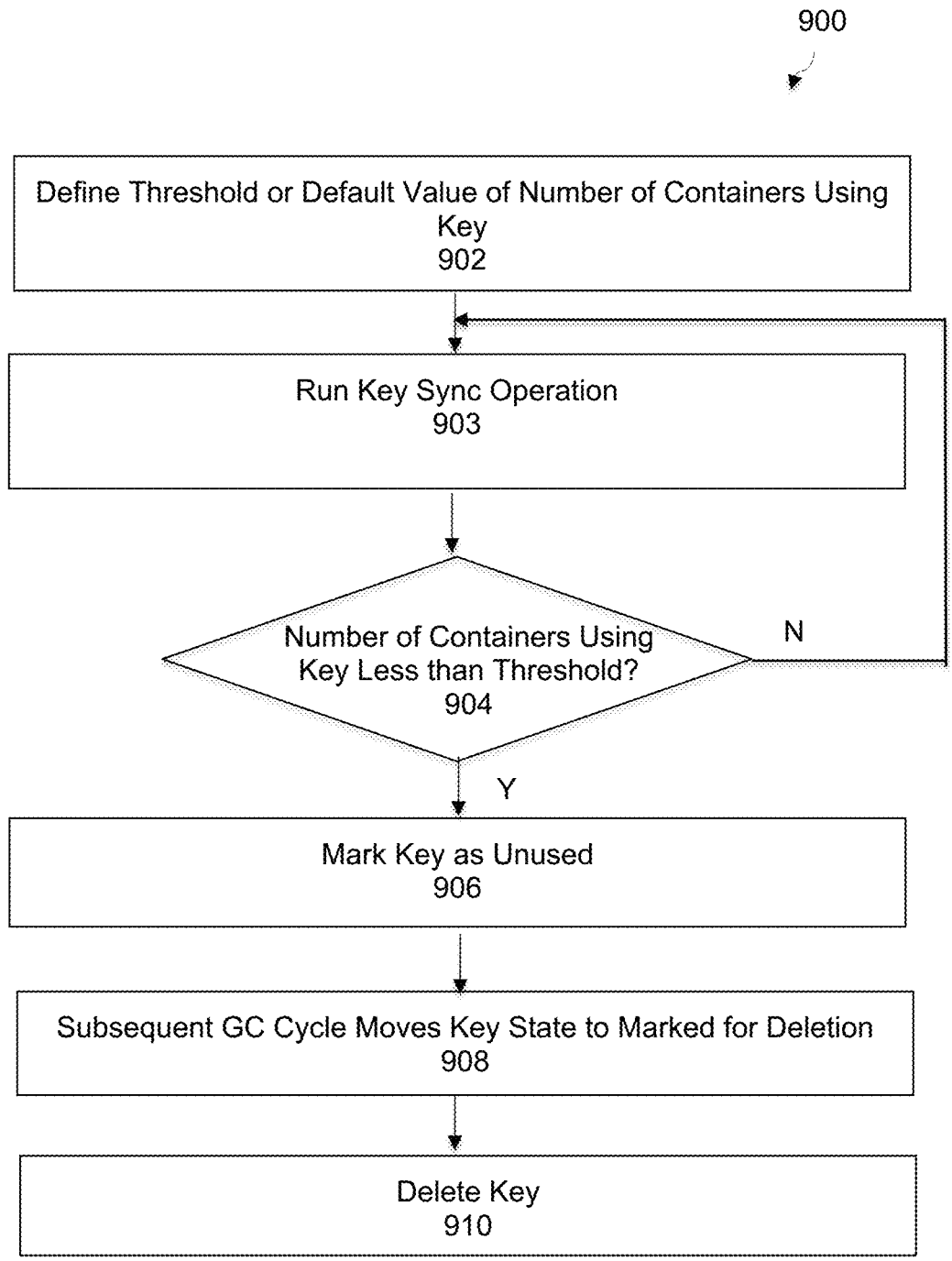
FIG. 9 is a flowchart that illustrates a method of deleting unused keys, under some embodiments.

FIG. 9 is a flowchart 900 illustrating deleting unused keys using a defined threshold value, under some embodiments. Process 900 of FIG. 9 begins by defining a minimum threshold value of containers or data amount encrypted with an encryption key, 902. This value dictates the amount of data below which a data key is associated with the data is considered as deletable. Any key having encrypted data above this amount will not be deleted until this value is reached. This threshold can be configured by a user or set by the system. By default the value of this threshold will be 0, but can be configured up to 10% by users. The percentage threshold in this case represents the amount of data associated with or encrypted by the encryption key in terms of number of containers (integer count) or amount of data (in bytes). Thus, if a key is initially associated with 10 MB of data, this amount of data will diminish over time because of progressive backup expirations. If the percentage threshold is set at 10%, a reduction down to the last remaining 1 MB of data will cause the key to be considered deletable and marked for deletion.

During a key synchronization operation 903, the entire key table (e.g., 700) is scanned and keys to find keys that have less than the specified (or default) threshold of data associated with them, step 904. Any keys found in step 904 are then marked as unused and for destruction, 906. For example, initially if the data associated with a key is 10 TB and the threshold is set to 10%. As the key table is scanned during the key sync operation, all the keys which have less than 1 TB of data associated with them will be marked for destruction.

After GC cycle, the filesystem will look at the keys which do not have any data (or data less than minimum threshold) associated with them. Keys marked for destruction/deletion in step 906 will then be subject to a subsequent GC cycle that will validate again that there is no more data is encrypted with that key, and the system will then delete the key automatically, 910.

Embodiments of the processes and techniques described above can be implemented on any appropriate data storage or backup system operating environment or file system, or network server system. Such embodiments may include other or alternative data structures or definitions as needed or appropriate.

Figure 10:
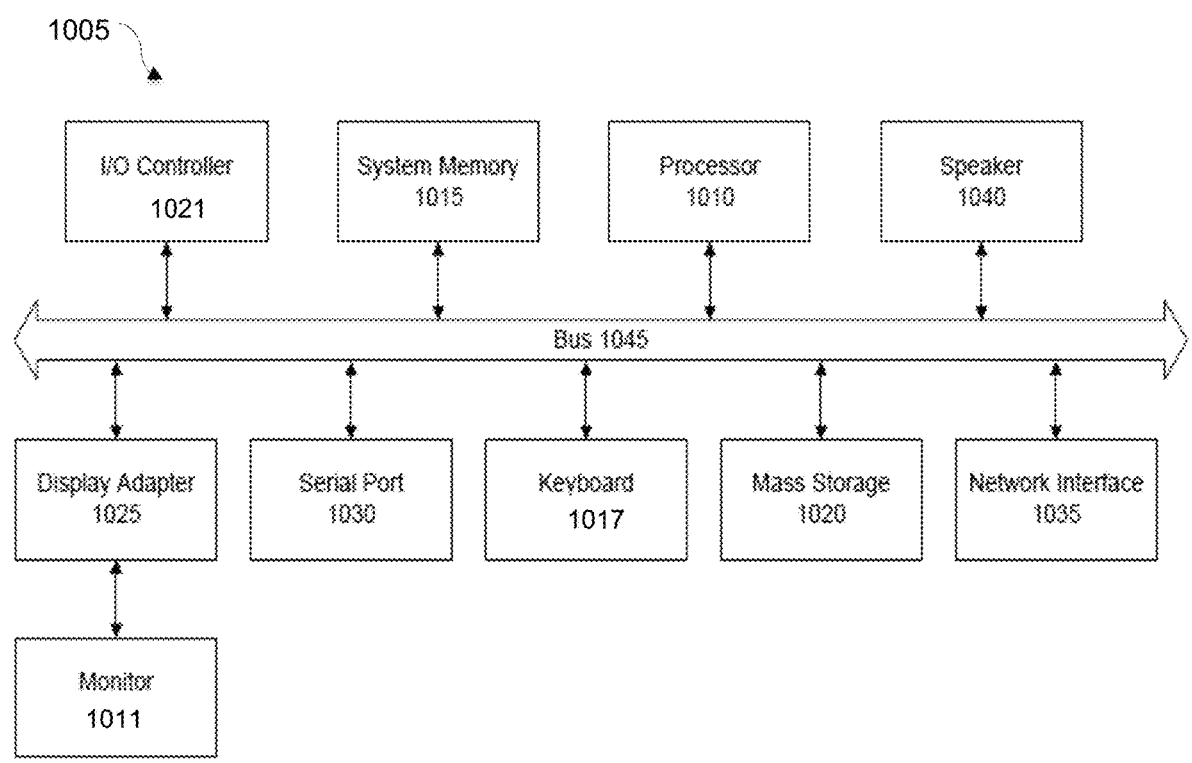
FIG. 10 is a system block diagram of a computer system used to execute one or more software components of the described systems and processes, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 10 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of deleting encryption keys in a data storage system, comprising:
    storing a current encryption key in a key table, the current key encrypting at least some data in one or more data containers of a filesystem of the data storage system;
    maintaining, in the key table, a starting container ID and an ending container ID for each container encrypted by the current encryption key;
    further maintaining, in the key table, a deleted container count counting a number of containers of the one or more data containers deleted from the filesystem; and
    determining if the number of containers in the deleted container count equals a number of containers having data encrypted by the encryption key as determined by the starting container ID and ending container ID, and if so, marking the key for deletion in a garbage collection (GC) operation and deleting the key from the key table in the garbage collection operation.

2. The method of claim 1 wherein the key table is stored in local memory as an indexed table that stores key information for a plurality of encryption keys used in the file system, wherein each encryption key is identified by a unique key index number referencing respective key information.

3. The method of claim 2 wherein the key information comprises an encryption algorithm utilized by each respective encryption key, a key length, the starting and ending container IDs, and the deleted container count.

4. The method of claim 3 further comprising:
performing a key rotation that retires the current key and encrypts new containers with a new encryption key; and
updating the starting container ID and ending container ID data elements for each of the current encryption key and new encryption key based on a first new container encrypted with the new encryption key.

5. The method of claim 4 wherein the key table is periodically scanned in a encryption key synchronization process that identifies keys marked for deletion, and wherein the identified keys are deleted by one or more subsequent GC cycles.

6. The method of claim 1 further comprising increasing the deleted container count by one for each container that no longer contains data encrypted by the current encryption key, and wherein a deleted container count that matches the difference between the ending container ID and the starting container ID indicates that zero containers have data encrypted by the current encryption key.

7. The method of claim 1 further comprising defining a minimum data threshold amount above zero to indicate an amount of encrypted data below which the current encryption key is marked for deletion, and wherein the minimum data threshold amount is less than ten percent of data in the encrypted with the current encryption key.

8. The method of claim 1 wherein the current encryption key is provided to a key manager component by one of an external key source utilizing a Key Management Interoperability Protocol (KMIP) or an embedded key source within the data storage system.

9. The method of claim 8 wherein the data storage system comprises part of a deduplication backup process executed by a data storage server running a Data Domain file system (DDFS).

10. A computer-implemented method of rotating encryption keys in filesystem of a data storage system, comprising:
defining a key rotation schedule to encrypt containers of the filesystem with respective encryption keys;
rotating encryption keys according to the key rotation schedule by retiring a current encryption key after encrypting a last container and encrypting new containers of the filesystem using a new encryption key;
tracking a number of containers containing data encrypted by the current encryption key;
determining if the number of containers containing data encrypted by the current encryption key falls below a defined minimum threshold or is zero, and if so, marking the current encryption key for deletion from the filesystem; and
deleting the current encryption key marked for deletion in a garbage collection (GC) operation.

11. The method of claim 10 wherein the key rotation schedule is based on at least one of an amount of time a current encryption key is used or an amount of data encrypted by the current encryption key.

12. The method of claim 10 wherein the rotated encryption keys are provided to a key manager component by one of an external key source utilizing a Key Management Interoperability Protocol (KMIP) or an embedded key source within the data storage system, and further wherein the data storage system comprises part of a deduplication backup process executed by a data storage server running a Data Domain file system (DDFS).

13. The method of claim 12 further comprising:
storing information for each rotated encryption key in a key table maintained in local memory;
maintaining, in the key table, a starting container ID and an ending container ID for each container encrypted by each respective encryption key; and
further maintaining, in the key table, a deleted container count counting a number of containers of the one or more data containers deleted from the filesystem and having data encrypted by the respective encryption key.

14. The method of claim 13 wherein the key rotation causes updating the starting container ID and ending container ID data elements for each of the current encryption key and new encryption key based on a first new container encrypted with the new encryption key.

15. The method of claim 14 further comprising increasing the deleted container count by one for each container that no longer contains data encrypted by the current encryption key, and wherein a deleted container count that matches the difference between the ending container ID and the starting container ID indicates that zero containers have data encrypted by the current encryption key.

16. The method of claim 15 further comprising:
periodically scanning, by an encryption key synchronization process, the key table to identify keys marked for deletion; and
deleting any identified keys in one or more subsequent GC cycles.

17. A system for rotating encryption keys in filesystem of a data storage system, comprising:
a hardware-based key rotation processing component defining a key rotation schedule to encrypt containers of the filesystem with respective encryption keys, and rotating encryption keys according to the key rotation schedule by retiring a current encryption key after encrypting a last container and encrypting new containers of the filesystem using a new encryption key;
a hardware-based key cleanup processing component tracking a number of containers containing data encrypted by the current encryption key, and determining if the number of containers containing data encrypted by the current encryption key falls below a defined minimum threshold or is zero, and if so, marking the current encryption key for deletion from the filesystem; and
a garbage collection processing component deleting the current encryption key marked for deletion.

18. The system of claim 17 further comprising a database stored in a physical memory device and maintaining a key table storing information for each rotated encryption key, wherein the key table maintains a starting container ID and an ending container ID for each container encrypted by each respective encryption key; and further maintains a deleted container count counting a number of containers of the one or more data containers deleted from the filesystem and having data encrypted by the respective encryption key.

19. The system of claim 18 wherein the key rotation processing component updates the starting container ID and ending container ID data elements for each of the current encryption key and new encryption key based on a first new container encrypted with the new encryption key, and wherein the key cleanup processing component increases the deleted container count by one for each container that no longer contains data encrypted by the current encryption key, and wherein a deleted container count that matches the difference between the ending container ID and the starting container ID indicates that zero containers have data encrypted by the current encryption key.

20. The system of claim 19 wherein the rotated encryption keys are provided to a key manager component by one of an external key source utilizing a Key Management Interoperability Protocol (KMIP) or an embedded key source within the data storage system, and further wherein the data storage system comprises part of a deduplication backup process executed by a data storage server running a Data Domain file system (DDFS).

* * * * *